3,254,984
HERBICIDAL COMPOSITION AND METHOD
Rayner S. Johnson, Wilmington, Del., assignor to E. I. du Pont de Nemours and Company, Wilmington, Del., a corporation of Delaware
No Drawing. Filed Jan. 9, 1963, Ser. No. 250,734
2 Claims. (Cl. 71—2.6)

This is a continuation-in-part of my copending application Serial No. 63,248, filed October 18, 1960 (now abandoned), which was a continuation-in-part of my then copending application Serial No. 59,832, filed October 3, 1960 (now abandoned).

This invention relates to a class of aryl hydroxyl ureas and to herbicidal compositions and methods.

More specifically, the compounds of this invention are those represented by the formula:

(1) 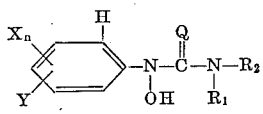

where
X is hydrogen, methyl or halogen;
Y is hydrogen, halogen, nitro, alkyl of less than 5 carbon atoms, or alkoxy of less than 5 carbon atoms;
$n$ is 1 or 2;
Q is oxygen or sulfur;
$R_1$ is alkyl of less than 5 carbon atoms, preferably methyl; and
$R_2$ is hydrogen, alkyl of less than 5 carbon atoms, or alkoxy of less than 5 carbon atoms;

provided the sum of carbon atoms in $R_1$ and $R_2$ is less than 6.

The compounds of this invention can be prepared by reacting a phenylhydroxylamine or a substituted phenylhydroxylamine with a substituted carbamyl chloride such as dimethylcarbamyl chlorine, dissolved in a suitable solvent such as pyridine, to obtain the corresponding 3-phenyl or 3-substituted phenyl-3-hydroxy urea. The reaction can be carried out conveniently at temperatures in the range from 0 to 30° C.

In an alternative procedure, in place of a substituted carbamyl chloride, an isocyanate such as methylisocyanate is used to obtain the corresponding 3-phenyl-3-hydroxy urea.

Thus by the above routes compounds such as the following can be prepared:

3-phenyl-3-hydroxy-1-methylurea
3-phenyl-3-hydroxy-1,1-dimethylurea
3-(p-chlorophenyl)-3-hydroxy-1-methylurea
3-(p-chlorophenyl)-3-hydroxy-1,1-dimethylurea
3-(3,4-dichlorophenyl)-3-hydroxy-1-methylurea
3-(3,4-dichlorophenyl)-3-hydroxy-1,1-dimethylurea
3-phenyl-3-hydroxy-1-butyl-1-methylurea
3-(p-chlorophenyl)-3-hydroxy-1-methyl-1-propylurea
3-(3,4-dichlorophenyl)-3-hydroxy-1-ethyl-1-methylurea
3-(o-chlorophenyl)-3-hydroxy-1,1-dimethylurea
3-(m-chlorophenyl)-3-hydroxy-1-ethyl-1-propylurea
3-(3,4-dimethylphenyl)-3-hydroxy-1,1-diethylurea
3-(3-chloro-4-isopropylphenyl)-3-hydroxy-1,1-dimethylurea
3-(3-chloro-4-methylphenyl)-3-hydroxy-1-methyl-1-isopropylurea
3-(3-nitro-4-chlorophenyl)-3-hydroxy-1-butyl-1-methylurea
3-(3-chloro-4-methoxyphenyl)-3-hydroxy-1-ethyl-1-methylurea
3-(3-bromo-4-butoxyphenyl)-3-hydroxy-1,1-dimethylurea
3-(p-fluorophenyl)-3-hydroxy-1-methyl-1propylurea
3-(3-nitro-4-methoxyphenyl)-3-hydroxy-1,1-dimethylurea The above listed oxyurea compounds, as well as others within this invention, can be named as their corresponding thiourea compounds, also within the scope of this invention, simply by inserting the word "thio" before "urea" in each instance.

The substituted ureas of the above-described type possess outstanding heribicidal activity. They are most effective as foliar herbicides and pre-emergence herbicides, being characterized by specific activity of an interesting, useful and unique type. They have the significant advantage of high oil solubility and soil persistence not possessed by certain closely related prior art compounds.

Of particular significance and advantage is the unobvious ability of the compounds of this invention to provide longer lasting weed control when compared with prior art herbicides. The compounds of this invention are particularly useful in weed control among such crops as asparagus, sugar cane, grapes and berries where effective weed control is obtained without corresponding injury to the crop.

Of the above-described compounds by far the best from the standpoint of usage are the following:

3-phenyl-3-hydroxy-1,1-dimethylurea
3-phenyl-3-hydroxy-1-methylurea
3-(p-chlorophenyl)-3-hydroxy-1,1-dimethylurea
3-(p-chlorophenyl)-3-hydroxy-1-methylurea
3-(3,4-dichlorophenyl)-3-hydroxy-1,1-dimethylurea
3-(3,4-dichlorophenyl)-3-hydroxy-1-methylurea These compounds are characterized not only by outstanding herbicidal activity, but furthermore are soluble in many common solvents such as benzene thereby making it possible to formulate these compounds as liquid concentrates. In contrast, the conventional substituted urea herbicides are highly insoluble in conventional solvents.

Herbicidal compositions of the invention are prepared by admixing the substituted urea, in a herbicidally effective amount, with a conditioning agent of the kind used and referred to in the art as a pest control adjuvant or modifier to provide formulations adapted for ready and efficient application to soil or weeds (i.e. unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound with finely-divided solids, preferably talcs, natural clays, pyrophyllite, diatomaceous earth, synthetic fine silicas, and calcium silicates or flours such as walnut shell, wheat, redwood, soybean, cottonseed flours and other insert solid conditioning agents or carriers of the kind conventionally employed in preparing pest control compositions in dust or powder form.

Liquid compositions of the invention are prepared in the usual way by admixing the substituted urea with a suitable liquid diluent media. With certain solvents such as alkylated naphthalene, dimethylformamide and cresol, relative high, up to about 35% by weight or more, concentrations of the active urea compound can be obtained in solution. Other liquids conventionally used in preparing liquid herbicidal compositions can also be used.

The herbicidal compositions of the invention whether in the form of dusts or liquids preferably also include a surface-active agent of the kind sometimes referred to in the art as a wetting, dispersing or emulsifying agent. These agents which will be referred to hereinafter more simply as surfactants cause the compositions to be easily dispersed in water to give aqueous sprays which for the most part constitute a desirable composition for application.

The surface-active agent or surfactant can include such anionic, cationic and non-ionic agents as have heretofore been generally employed in pest control compositions of similar type. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers—Up to Date" (1962) by John W. McCutcheon, Inc., and Bulletin E-607 of the Bureau of Entomology and Plant Quarantine of the U.S. Department of Agriculture.

Suitable surface-active agents for use in compositions of the present invention are: polyethylene glycol fatty esters and fatty alkylol amide condensates, alkyl aryl sulfonates, fatty alcohol sulfates, dialkyl esters of sodium sulfosuccinate, fatty acid esters of sodium isethionate, polyoxyethylene thioethers, and long chain quaternary ammonium chloride.

Surface-active dispersing agents such as sodium lignin sulfonates, low viscosity methyl cellulose, polymerized sodium salts of alkyl naphthalene sulfonic acids are also suitable in the herbicidal compositions of this invention.

Among the more preferred surfactants are the anionic and non-ionic type. Among the anionic surface-active agents, preferred ones are alkali metal or amine salts of alkyl benzene sulfonic acids such as dodecylbenzenesulfonic acid, sodium lauryl sulfate, alkyl naphthalene sulfonates, sodium N-methyl-N-oleoyltaurate, oleic acid ester of sodium isethionate, dioctyl sodium sulfosuccinate, sodium dodecyldiphenoloxide disulfonate. Among the nonionic compounds, preferred members are alkyl phenoxy poly(ethyleneoxy)ethanols such as nonyl phenol adducts with ethylene oxide; trimethyl nonyl polyethylene glycol ethers, polyethylene oxide adducts of fatty and rosin acids, long chain alkyl mercaptan adducts with ethylene oxide and polyethylene oxide adducts with sorbitan fatty acid esters.

In general, less than 10% by weight of the surface-active agent will be used in compositions of this invention and ordinarily the amount of surface-active agents will range from 1–5% but may even be less than 1% by weight.

Additional surface-active agents can be added to the above formulation to increase the ratio of surface-active agent:active agent up to as high as 5:1 by weight. Normally the purpose of adding higher amounts of surfactant is to increase the herbicidal effect of the active compounds. When used at higher rates it is preferred that the surfactant be present in the range of one fifth to five parts surfactant for each one part of active agent.

The herbicidal compositions are applied either as a spray, granule, pellet, or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds but, if desired, the application can be made in advance of an anticipated weed infestation to prevent such infestation. Thus the compositions can be applied as aqueous foliar sprays and can also be applied as sprays directly to the surface of the soil. Alternatively, the dried powder compositions can be dusted directly on the plants or on the soil. Application of granules is an effective method for obtaining pre-emergence control of weeds with minimum injury to foilage of desired growing plants. Application of pellets, either by hand or by machine applicators, e.g. by airplane, is an effective method for obtaining complete kill of undesired brush growth in fence rows, under power lines, etc.

The active compound is, of course, applied in amount sufficient to exert the desired herbicidal action. The amount of the active substituted urea present in the compositions as actually applied for destroying, preventing, or controlling weeds will vary with the manner of application, the particular weeds for which control is sought, the purposes for which the application is being made, and like variables. In general, the herbicidal compositions as applied in the form of a spray, granule, pellet, or a dust will contain from about 0.5% to 85% by weight of substituted urea.

Ordinarily, the herbicidal compounds used in this invention will be applied to an area to be treated at a rate of 0.25 to 100 pounds per acre.

Fertilizer materials, other herbicidal agents, and other pest control agents such as insecticides and fungicides can be included in the herbicidal compositions of the invention if desired. Particularly useful compositions will contain, for each ten parts by weight of a compound of the present invention another herbicidally active ingredient listed as follows in the indicated amount expressed as parts by weight.

| Herbicide: | Parts |
|---|---|
| 3-(3,4-dichlorophenyl)-1,1-dimethylurea | 2–30 |
| 3-(4-chlorophenyl)-1,1-dimethylurea | 2–30 |
| 3-phenyl-1,1-dimethylurea | 2–30 |
| 3 - (3,4 - dichlorophenyl) - 3-methoxy-1,1-dimethylurea | 2–30 |
| 3 - (3,4 - dichlorophenyl) - 1-n-butyl-1-methylurea | 2–30 |
| 3 - (3,4 - dichlorophenyl) - 1-methoxy-1-methylurea | 2–30 |
| 3 - (4 - chlorophenyl) - 1 - methoxy - 1 - methylurea | 2–30 |
| 3-(3,4-dichlorophenyl)-1,1,3-trimethylurea | 2–30 |
| 3-(3,4-dichlorophenyl)-1,1-diethylurea | 2–30 |
| 3 - (p - chlorophenoxyphenyl) - 1,1 - dimethylurea | 2–30 |
| 2-chloro-4,6-bis(ethylamino)-s-triazine | 2–30 |
| 2 - chloro-4-ethylamino-6-isopropylamino-s-triazine | 2–30 |
| 2 - chloro-4,6-bis(methoxypropylamino)-s-triazine | 2–30 |
| 2 - methoxy - 4,6 - bis(isopropylamino)-s-triazine | 2–30 |
| 2 - diethylamino - 4 - isopropylacetamido - 6-methoxy-s-triazine | 2–30 |
| 2 - isopropylamino - 4 - methoxyethylamino-6-methylmercapto-s-triazine | 2–30 |
| 2 - methylmercapto - 4,6 - bis(isopropyl) - s-triazine | 2–30 |
| 2 - methylmercapto - 4,6 - bis(ethylamino) - s-triazine | 2–30 |
| 2 - methylmercapto - 4 - ethylamino - 6 - isopropylamino-s-triazine | 2–30 |
| 2-methoxy-4,6-bis(ethylamino)-s-triazine | 2–30 |
| 2 - methoxy - 4 - ethylamino - 6 - isopropylamino-s-triazine | 2–30 |
| 2-chloro-4,6-bis(isopropylamino)-s-triazine | 2–30 |
| Dinitro-sec. butylphenol and its salts | 0.1–400 |
| Pentachlorophenol and its salts | 1.6–1200 |
| 2,3,6-trichlorobenzoic acid and its salts | 1.5–70 |
| 2,3,5,6-tetrachlorobenzoic acid and its salts | 2–90 |
| 2-methoxy-3,5,6-trichlorobenzoic acid and its salts | 2–90 |
| 2-methoxy-3,6-dichlorobenzoic acid and its salts | 2–90 |
| 3-amino-2,5-dichlorobenzoic acid and its salts | 2–90 |
| 3-nitro-2,5-dichlorobenzoic acid and its salts | 2–90 |
| 2-methyl-3,6-dichlorobenzoic acid and its salts | 1.5–70 |
| 2,4-dichlorophenoxyacetic acid and its salts and esters | 0.1–80 |
| 2,4,5-trichlorophenoxyacetic acid and its salts and esters | 0.1–80 |

| Herbicide: | Parts |
|---|---|
| (2-methyl-4-chlorophenoxy)acetic acid and its salts and esters | 0.1–80 |
| 2-(2,4,5-trichlorophenoxy)propionic acid and its salts and esters | 0.1–80 |
| 2-(2,4,5-trichlorophenoxy)ethyl-2,2-dichloropropionate | 0.1–80 |
| 4-(2,4-dichlorophenoxy)butyric acid and its salts and esters | 0.2–160 |
| 4-(2-methyl-4-chlorophenoxy)butyric acid and its salts and esters | 0.2–160 |
| 2,3,6-trichlorobenzyloxypropanol | 0.2–160 |
| 2,6-dichlorobenzonitrile | 0.2–240 |
| Trichloroacetic acid and its salts | 0.2–240 |
| 2,2-dichloropropionic acid and its salts | 0.2–240 |
| N,N-di(n-propyl)thiolcarbamic acid, ethyl ester | 0.1–80 |
| N,N-di(n-propyl)thiolcarbamic acid, n-propyl ester | 0.1–80 |
| N-ethyl-N-(n-butyl)thiolcarbamic acid, ethyl ester | 0.1–80 |
| N-ethyl-N-(n-butyl)thiolcarbamic acid, n-propyl ester | 0.1–80 |
| N-phenylcarbamic acid, isopropyl ester | 3–400 |
| N-(m-chlorophenyl)carbamic acid, isopropyl ester | 3–400 |
| N-(m-chlorophenyl)carbamic acid, 4-chloro-2-butynyl ester | 3–400 |
| 2,3,6-trichlorophenylacetic acid and its salts | 1.5–70 |
| 2-chloro-N,N-diallylacetamide | 3–240 |
| Maleic hydrazide | 3–320 |
| Calcium propylarsonate | 7.5–450 |
| Disodium monomethylarsonate | 7.5–400 |
| Octyl-dodecylammoniummethylarsonate | 7.5–400 |
| Dimethylarsinic acid | 7.5–400 |
| Sodium arsenite | 4–300 |
| Lead arsenate | 3200–130,000 |
| Calcium arsenate | 1600–65,000 |
| Sodium tetraborate hydrated, granulated | 900–32000 |
| Sodium metaborate | 900–32000 |
| Sodium pentaborate | 900–32000 |
| Polyborchlorate | 900–32000 |
| Unrefined borate ore such as borascu | 900–32000 |
| Ammonium thiocyanate | 0.1–400 |
| Sodium chlorate | 2.5–2000 |
| Ammonium sulfamate | 4–800 |
| 5,6-dihydro(4A,6A)-dipyrido-(1,2-A,2',1'-C) pyrazinium dibromide | 0.1–240 |
| 3-amino-1,2,4-triazole | 0.5–200 |
| 3,6-endoxohexahydrophthalic acid | 3–200 |
| Hexachloroacetone | 5–160 |
| Diphenylacetonitrile | 1–300 |
| N,N-dimethyl-α,α-diphenylacetamide | 1–300 |
| N,N-di-n-propyl-2,6-dinitro-4-trifluoromethylaniline | 1–300 |
| N,N-di-n-propyl-2,6-dinitro-4-methylaniline | 1–300 |
| O-(2,4-dichlorophenyl)-O-methyl-isopropylphosphoramidothiate | 2.5–200 |
| 2,3,5,6-tetrachloroterephthalic acid, dimethyl ester | 2.5–200 |
| 2,4-dichloro-4'-nitrodiphenyl ether | 1–300 |

In order that the invention may be better understood, the following examples are given in addition to the examples already given above. The examples illustrate the preparation of the substituted ureas, herbicidal formulations employing such compounds, herbicidal applications, and the results obtained. All percents are by weight unless otherwise indicated.

EXAMPLE 1

3-(3,4-dichlorophenyl)-3-hydroxy-1,1dimethylurea

A mixture of 10.8 parts by weight of dimethylcarbamyl chloride and 10.1 parts by weight of pyridine in 75 parts by weight of dioxane is added slowly with stirring to a solution of 17.8 parts by weight of dichlorophenylhydroxylamine in 75 parts by weight of dioxane. The temperature is maintained below 30° C. Upon completion of the addition the mixture is stirred 30 min. longer then poured into an excess of cold water whereupon 3-(3,4-dichlorophenyl)-3-hydroxy-1,1-dimethylurea separates in relatively pure form.

EXAMPLE 2

3-(p-chlorophenyl)-3-hydroxy-1-methylurea

A stirred solution of 14.3 parts by weight of a p-chlorophenylhydroxylamine in 100 parts by weight of benzene is treated gradually at 20° C. with 5.3 parts by weight of methyl isocyanate. After an additional 30 min. stirring period the solvent is removed from the reaction and relatively pure 3-(p-chlorophenyl)-3-hydroxy-1-methylurea remains behind.

EXAMPLE 3

To demonstrate the herbicidal activity of the compounds of Examples 1 and 2, they are applied at the rate of 4 lbs./acre (active) in the form of a spray containing 1% by weight of these compounds to the foliage of mustard plants and Johnson grass seedlings. It is found that these treatments give good control of both the mustard plants (dioctyledonous plants) and the Johnson grass seedlings (monocotyledonous plants), thereby indicating high foliar activity against both these types of plants. The pre-emergence activity of these compounds is demonstrated by applying them at the rate of 1, 2 and 3 pounds per acre to plots containing seeds of a variety of broadleaf and grassy weeds. It is found that these treatments also give good control of the weeds. Thus, it is found that these compounds have outstandingly high herbicidal activity not only in foliar applications but also in pre-emergence treatment.

EXAMPLE 4

The compounds of this invention are formulated into water-dispersible powder herbicidal compositions in accordance with the present invention to provide a composition suitable for dispersion in water to give a herbicidal spray. The water-dispersible powder compositions are made by intimately mixing the ingredients listed below using conventional mixing equipment and then grinding the mixture to give a powder having an average particle size less than about 50 microns.

| | Percent |
|---|---|
| Active ingredient | 75 |
| Fuller's earth | 23.75 |
| Sodium lauryl sulfate, 50% (wetting agent) | 1 |
| Methyl cellulose, 15 cps. (dispersing agent) | 0.25 |

This formulation is used as a pre-emergence treatment in a newly planted field of cotton. When applied at the rate of 1.5 lbs./acre of active ingredient in 40 gallons of water, excellent control of germinating annual grasses and broadleaves is obtained.

The compounds of this invention are formulated into dust compositions in accordance with the present invention that are adapted for direct application as a dust. These dust compositions are made by blending or mixing the ingredients shown below and grinding the mix to give a composition having an average particle size less than about 50 microns.

| | Percent |
|---|---|
| Active ingredient | 20 |
| Talc | 80 |

The compounds of this invention are formulated into a powdered herbicidal concentrate adapted for use in the prepararation of a spray using either an oil, water, or a combination of oil and water as a liquid diluent. The powder concentrates are made by conventional mixing and grinding operations using the materials shown below in the rate proportions indicated.

| | Percent |
|---|---|
| Active ingredient | 70 |
| Trimethylnonyl ether of polyethylene glycol (Tergitol TMN) | 4 |
| Fuller's earth | 26 |

The compounds of this invention are formulated into emulsifiable oil compositions of the types shown below by thoroughly mixing and dispersing the active ingredient and conditioning agents in the organic diluent.

| | Percent |
|---|---|
| Active ingredient | 15 |
| Mixed oil soluble petroleum sulfonates and polyoxyethylene sorbitol ester of tall oil acids | 57 |
| Alkylated naphthalene (principally α-methylnaphthalene) | 80 |

EXAMPLE 5

The compounds of this application are formulated into water-dispersible powders by intimately mixing the ingredients listed below with conventional mixing equipment and then grinding the mixture to give powders having an average particle size less than about 50 microns. A typical composition is:

| | Percent |
|---|---|
| 3-(p-chlorophenyl)-3-hydroxy-1,1-dimethylurea | 75.00 |
| Fuller's earth | 23.75 |
| Sodium lauryl sulfate, 50% (wetting agent) | 1.00 |
| Methyl cellulose, 15 cps. (dispersing agent) | 0.25 |

The resulting formulation is then diluted with water (15 lbs./100 gallons) and applied at the rate of 30 lbs./acre (active) with a tractor mounted sprayer. This treatment gives excellent control of a mixed population of broadleaves and grass weeds such as crabgrass, quackgrass, ragweed, lambs-quarters, and goldenrod.

EXAMPLE 6

These compounds can also be formulated into dust compositions. A typical dust composition is prepared by blending or mixing the ingredients shown below and grinding the mix to give a composition having an average particle size less than about 50 microns.

| | Percent |
|---|---|
| 3-(3,4-dichlorophenyl)-3-hydroxy-1-butyl-1-methyl-urea | 5 |
| Talc | 95 |

This dust composition is used at the rate of 20 lbs./acre (active) for the control of vegetation growing around power transformers, telephone poles and highway markers. Excellent control of a general infestation of annual broadleaf and grass species such as pigweed, lambsquarter, foxtail, barnyard grass and crabgrass is obtained.

EXAMPLE 7

| | Percent |
|---|---|
| 3-phenyl-3-hydroxy-1-dimethylurea | 4 |
| Granular attapulgite | 96 |

The above granular product is prepared by tumbling the attapulgite granules in a drum while spraying on a solution of the urea in acetone, then removing the acetone with heat.

This formulation has excellent utility for the control of deep-rooted perennial weeds, when applied with an adapted tractor spreader at the rate of 30 lbs./acre of active ingredient. Good control of field bindweed, leafy spurge, quackgrass and nutsedge is obtained.

This formulation is applied easily to weeds growing along railroad rights-of-way. Twenty lbs./acre (active) gives excellent control of crabgrass, wild barley, foxtail, barnyard grass, ragweed and goldenrod.

EXAMPLE 8

| | Percent |
|---|---|
| 3-(2,4,5-trichlorophenyl)-3-hydroxy-1-ethyl-1-methyl urea | 25 |
| Anhydrous sodium sulfate | 10 |
| Alkyl naphthalene sulfonic acid, Na salt | 1 |
| Ca, Mg, bentonite | 64 |

The finely divided components are first blended, then moistened with water and extruded to form pellets and dried.

This formulation gives excellent control of brush species. Rates of 30 lbs./acre of the formulation gives excellent control of oak and winged elm in pastures. Sixty pounds per acre of the formulation gives control of maple, ash, willow, privet and poplar growing in fence rows.

EXAMPLE 9

The herein described compounds may be formulated into emulsifiable oil compositions of the type illustrated below by dissolving the urea and the conditioning agents in the organic diluent.

| | Percent |
|---|---|
| 3-(3,4-dichlorophenyl)-3-hydroxy-1,1-dimethylurea | 15 |
| Xylene | 80 |
| Trimethylnonyl ether of polyethylene glycol (Tergitol TMN) | 5 |

This emulsifiable oil is mixed with 100 gallons of water at the site of spraying. When applied at the rate of 25 lbs./acre (active) on ditch banks, excellent control of quackgrass, crabgrass, foxtail, downy bromegrass, ragweed, pigweed and purslane is obtained.

EXAMPLE 10

3-(p-chlorophenyl)-3-hydroxy-1-methylurea is dissolved in "Lion Herbicidal Oil No. 6" (1 lb./10 gallons of oil) and applied with a railroad spray car at the rate of 15 lbs. of active ingredient along railroad rights-of-way. Excellent control of established mature vegetation such as wild mustard, peppergrass, morning glory, jimsonweed, cockleburr, crabgrass and seedling Johnson grass is obtained.

EXAMPLE 11

| | Percent |
|---|---|
| 3-(3,4-dichlorophenyl)-3-hydroxy-1,1-dimethyl-urea | 75.00 |
| Fuller's earth | 27.75 |
| Sodium lauryl sulfate, 50% | 1.00 |
| Methyl cellulose, 15 cps. | 0.25 |

This wettable powder formulation, applied at the rate of three pounds per acre of active ingredient in 40 gallons of water, gives excellent pre-emergence control of a mixed population of annual broadleaf and grass weeds in an asparagus planting. Extended residual weed control is obtained throughout the growing season.

An early spring application of 4 lbs./acre of active ingredient in 40 gallons of water gives excellent control of annual broadleaf and grass weeds in grapes throughout the spring and summer season.

EXAMPLE 12

| | Percent |
|---|---|
| 3-(3,4-dichlorophenyl)-3-hydroxy-1-methylurea | 75.00 |
| Fuller's earth | 27.75 |
| Sodium lauryl sulfate, 50% | 1.00 |
| Methyl cellulose, 15 cps. | 0.25 |

Twenty-five pounds of the above composition is dispersed in 100 gallons of a 1.5% solution of trimethylnonylpolyethylene glycol ether in water. The liquid product is then sprayed on young weeds growing around a grain elevator. Excellent control is obtained over giant foxtail, wild oats, cress, wild mustard, chickweed, volunteer wheat and oats and crabgrass. A rapid kill of existing foliage is noted.

EXAMPLE 13

| | Percent |
|---|---|
| 3-(p-chlorophenyl)-3-hydroxy-1-methylurea | 75.00 |
| Fuller's earth | 23.75 |
| Sodium lauryl sulfate, 50% | 1.00 |
| Methyl cellulose, 15 cps. | 0.25 |

This wettable powder is mixed with a water dispersible composition of 2-chloro-4-ethylamino-6-isopropylamino-s-triazine in the ratio of 10 pounds of 3-(p-chlorophenyl)-3-hydroxy-1-methylurea to 10 pounds of triazine in 100 gallons of water. This newly-formed composition is applied to a one acre area along a highway guard rail. Excellent control is obtained over dandelion, plantain, chicory, crabgrass, foxtail, barnyard grass, quackgrass, cheat and wild oats.

EXAMPLE 14

| | Percent |
|---|---|
| 1-methyl-3-hydroxy-3-phenylurea | 75.00 |
| Attapulgite | 23.00 |
| Sodium methyl phenylsulfonate | 1.75 |
| Methocel, 15 cps. | 0.25 |

The above ingredients are blended and micropulverized until the average particle size is less than 50 microns and then reblended.

This formulation is applied to a parking lot walkway at the rate of two pounds of active ingredient in 40 gallons of water before any weeds appeared. Excellent control is obtained over Bermudagrass growing from seed, ryegrass, crabgrass, barnyard grass, pigweed, mustard, chickweed, wild oats and cress.

EXAMPLES 15–21

The following compounds are substituted, one at a time, in like amount by weight for the 1-methyl-3-hydroxy-3-phenylurea of Example 14. They are formulated and applied in like manner. Like results are obtained.

15. 3-phenyl-3-hydroxy-1,1-dimethylthiourea
16. 3-(p-chlorophenyl)-3-hydroxy-1-methylthiourea
17. 3-(3,4-dichlorophenyl)-3-hydroxy-1-methylurea
18. 3-(p-nitrophenyl)-3-hydroxy-1-methylurea
19. 3-(p-ethoxyphenyl)-3-hydroxy-1-methylurea
20. 3-(p-ethylphenyl)-3-hydroxy-1-methylurea
21. 3-(3,4-dichlorophenyl)-3-hydroxy-1-methyl-1-methoxyurea

EXAMPLE 22

| | Percent |
|---|---|
| 3-(3,4-dichlorophenyl)-3-hydroxy-1,1-dimethylurea | 3 |
| 3-(3,4-dichlorophenyl)-1,1-dimethylurea | 3 |
| Talc | 94 |

A dust composition is prepared by blending and mixing the ingredients until the particles are all below 50 microns.

This dust composition is used at the rate of 20 pounds per acre of active compounds for the control of vegetation growing along railroad rights-of-way. Excellent control is obtained over a general infestation of broadleaf and grass species.

EXAMPLES 23–93

The following compounds are substituted one at a time for the 3-(3,4-dichlorophenyl)-1,1-dimethylurea of Example 22 in like amount by weight. They are formulated and applied in like manner to give like results.

23. 3-(4-chlorophenyl)-1,1-dimethylurea
24. 3-phenyl-1,1-dimethylurea
25. 3-(3,4-dichlorophenyl)-3-methoxy-1,1-dimethylurea
26. 3-(3,4-dichlorophenyl)-1-n-butyl-1-methylurea
27. 3-(3,4-dichlorophenyl)-1-methoxy-1-methylurea
28. 3-(4-chlorophenyl)-1-methoxy-1-methylurea
29. 3-(3,4-dichlorophenyl)-1,1,3-trimethylurea
30. 3-(3,4-dichlorophenyl)-1,1-diethylurea
31. 3-(p-chlorophenoxyphenyl)-1,1-dimethylurea
32. 2-chloro-4,6-bis(ethylamino)-s-triazine
33. 2-chloro-4-ethylamino-6-isopropylamino-s-triazine
34. 2-chloro-4,6-bis(methoxypropylamino)-s-triazine
35. 2-methoxy-4,6-bis(isopropylamino)-s-triazine
36. 2-diethylamino-4-isopropylacetamido-6-methoxy-s-triazine
37. 2-isopropylamino-4-methoxyethylamino-6-methylmercapto-s-triazine
38. 2-methylmercapto-4,6-bis-(isopropylamino)-s-triazine
39. 2-methylmercapto-4,6-bis-(ethylamino)-s-triazine
40. 2-methylmercapto-4-ethylamino-6-isopropylamino-s-triazine
41. 2-methoxy-4,6-bis-(ethylamino)-s-triazine
42. 2-methoxy-4-ethylamino-6-isopropylamino-s-triazine
43. 2-chloro-4,6-bis-(isopropylamino)-s-triazine
44. Dinitro-o-sec.butylphenol and its salts
45. Pentachlorophenol and its salts
46. 2,3,6-trichlorobenzoic acid and its salts
47. 2,3,5,6-tetrachlorobenzoic acid and its salts
48. 2-methoxy-3,5,6-trichlorobenzoic acid and its salts
49. 2-methoxy-3,6-dichlorobenzoic acid and its salts
50. 3-amino-2,5-dichlorobenzoic acid and its salts
51. 3-nitro-2,5-dichlorobenzoic acid and its salts
52. 2-methyl-3,6-dichlorobenzoic acid and its salts
53. 2,4-dichlorophenoxyacetic acid and its salts and esters
54. 2,4,5-trichlorophenoxyacetic acid and its salts and esters
55. (2-methyl-4-chlorophenoxy)acetic acid and its salts and esters
56. 2-(2,4,5-trichlorophenoxy)propionic acid and its salts and esters
57. 2-(2,4,5-trichlorophenoxy)ethyl-2,2-dichloropropionate
58. 4-(2,4-dichlorophenoxy)butyric acid and its salts and esters
59. 4-(2-methyl-4-chlorophenoxy)butyric acid and its salts and esters
60. 2,3,6-trichlorobenzyloxypropanol
61. 2,6-dichlorobenzonitrile
62. Trichloroacetic acid and its salts
63. 2,2-dichloropropionic acid and its salts
64. N,N-di(n-propyl)thiolcarbamic acid, ethyl ester
65. N,N-di(n-propyl)thiolcarbamic acid, n-propyl ester
66. N-ethyl-N-(n-butyl)thiolcarbamic acid ethyl ester
67. N-ethyl-N-(n-butyl)thiolcarbamic acid, n-propyl ester
68. N-phenylcarbamic acid, isopropyl ester
69. N-(m-chlorophenyl)carbamic acid, isopropyl ester
70. N-(m-chlorophenyl)carbamic acid, 4-chloro-2-butynyl ester
71. 2,3,6-trichlorophenylacetic acid and its salts
72. 2-chloro-N,N-diallylacetamide
73. Maleic hydrazide
74. Calcium propylarsonate
75. Disodium monomethylarsonate
76. Octyl-dodecylammoniummethylarsonate
77. Dimethylarsinic acid
78. Sodium arsenite
79. Unrefined borate ore such as borascu
80. Ammonium thiocyanate
81. Sodium chlorate
82. Ammonium sulfamate
83. 5,6-dihydro-(4A,6A)dipyrido-(1,2-A,2',1'-C)pyrazinium dibromide
84. 3-amino-1,2,4-triazole
85. 3,6-endoxohexahydrophthalic acid
86. Hexachloroacetone
87. Diphenylacetonitrile
88. N,N-dimethyl-$\alpha,\alpha$-diphenylacetamide
89. N,N-di-n-propyl-2,6-dinitro-4-trifluoromethylaniline
90. N,N-di-n-propyl-2,6-dinitro-4-methylaniline
91. O-(2,4-dichlorophenyl)-O-methyl-isopropylphosphoramidothiate
92. 2,3,5,6-tetrachloroterephthalic acid, dimethyl ester
93. 2,4-dichloro-4'-nitrodiphenyl ether

The invention claimed is:
1. The method of killing weeds comprising applying to the area to be protected a herbicidally effective amount of a compound of the formula

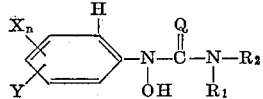

where

X is selected from the group consisting of hydrogen, methyl and halogen;
Y is selected from the group consisting of hydrogen, halogen, nitro, alkyl of less than 5 carbon atoms and alkoxy of less than 5 carbon atoms;
$n$ is a positive number less than 3;
Q is selected from the group consisting of oxygen and sulfur;
$R_1$ is alkyl of less than 5 carbon atoms; and
$R_2$ is selected from the group consisting of hydrogen, alkyl of less than 5 carbon atoms and alkoxy of less than 5 carbon atoms; with the limitation that the sum of carbon atoms in $R_1$ and $R_2$ is less than 6.

2. A herbicidal composition comprising a major amount of a herbicidally acceptable diluent and a herbicidal amount of a compound of the formula

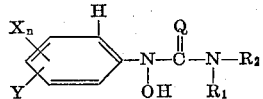

where

X is selected from the group consisting of hydrogen, methyl and halogen;
Y is selected from the group consisting of hydrogen, halogen, nitro, alkyl of less than 5 carbon atoms and alkoxy of less than 5 carbon atoms;
$n$ is a positive number less than 3;
Q is selected from the group consisting of oxygen and sulfur;
$R_1$ is alkyl of less than 5 carbon atoms; and
$R_2$ is selected from the group consisting of hydrogen, alkyl of less than 5 carbon atoms and alkoxy of less than 5 carbon atoms; with the limitation that the sum of carbon atoms in $R_1$ and $R_2$ is less than 6.

References Cited by the Examiner

UNITED STATES PATENTS

| | | | |
|---|---|---|---|
| 2,651,620 | 9/1953 | Hill et al. | 260—553 |
| 2,709,648 | 5/1955 | Ryker et al. | 71—2.6 |
| 2,870,205 | 1/1959 | Beaver et al. | 260—553 |
| 2,876,088 | 3/1959 | Hill et al. | 71—2.6 |
| 2,898,206 | 8/1959 | Monoogian | 71—2.6 |
| 2,960,534 | 11/1960 | Scherer et al. | 260—553 |
| 3,089,765 | 5/1963 | Gerjovick et al. | 71—2.6 |
| 3,112,342 | 11/1963 | Luckenbaugh | 71—2.6 X |

OTHER REFERENCES

Beckman: Annalen der Chemie, vol. 365, page 212 (1909).
Jones: J. Amer. Chem. Soc., vol. 49 (1927), page 1531.
Kjellin: Berichte Chemische, vol. 26, page 238 (1893).

LEWIS GOTTS, *Primary Examiner.*

DUVAL T. McCUTCHEN, JULIAN S. LEVITT,
*Examiners.*

HENRY R. JILES, JAMES O. THOMAS,
*Assistant Examiners.*